United States Patent
Yamaguchi

(10) Patent No.: US 11,215,589 B2
(45) Date of Patent: Jan. 4, 2022

(54) DATA ANALYZER FOR CHROMATOGRAPH MASS SPECTROMETRY

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 434 days.

(21) Appl. No.: 16/347,483

(22) PCT Filed: Nov. 9, 2016

(86) PCT No.: PCT/JP2016/083173
§ 371 (c)(1),
(2) Date: May 3, 2019

(87) PCT Pub. No.: WO2018/087824
PCT Pub. Date: May 17, 2018

(65) Prior Publication Data
US 2019/0277817 A1    Sep. 12, 2019

(51) Int. Cl.
*G01N 30/72* (2006.01)
*G01N 27/622* (2021.01)
(Continued)

(52) U.S. Cl.
CPC ......... *G01N 30/7206* (2013.01); *G01N 27/62* (2013.01); *G01N 27/622* (2013.01);
(Continued)

(58) Field of Classification Search
CPC .... G01N 30/7206; G01N 30/86; G01N 30/74; G01N 30/78; G01N 30/72;
(Continued)

(56) References Cited

U.S. PATENT DOCUMENTS

| 2002/0074490 A1* | 6/2002 | Umemura | H01J 49/04 250/288 |
| 2013/0116933 A1* | 5/2013 | Geromanos | H01J 49/0036 702/28 |

(Continued)

FOREIGN PATENT DOCUMENTS

| CN | 104508474 A | 4/2015 |
| DE | 112013003346 T5 | 3/2015 |

(Continued)

OTHER PUBLICATIONS

Communication dated Oct. 25, 2019 from the European Patent Office in application No. 16921395.6.
(Continued)

*Primary Examiner* — Jason L McCormack
(74) *Attorney, Agent, or Firm* — Sughrue Mion, PLLC

(57) ABSTRACT

A multivariate analysis operation unit (43) represents each of chromatogram data at a specific wavelength λ1 in data acquired by a PDA detector (2) and mass spectrum data repeatedly obtained by a mass spectrometer (3) in the form of a matrix, and then calculates a regression coefficient matrix by performing a PLS operation with a two-dimensional matrix based on the mass spectrum data as an explanatory variable and a one-dimensional matrix based on the chromatogram data as an explained variable. A regression coefficient is obtained with respect to each m/z value, and an m/z value having a high regression coefficient indicates an m/z value of which the chromatogram wavelength at a specific wavelength is similar to an extracted ion chromatogram (XIC). Accordingly, an m/z-value extracting unit (44) compares the regression coefficient with a threshold and extracts a significant m/z value, and an XIC creating unit (46) creates an XIC of the extracted m/z value. By specifying the wavelength λ1 that an operator's target partial chemical structure specifically absorbs, an XIC correspond-
(Continued)

ing to a molecular species containing the partial chemical structure can be obtained without waveform processing manually performed by the operator.

5 Claims, 3 Drawing Sheets

(51) Int. Cl.
| | |
|---|---|
| *G01N 27/64* | (2006.01) |
| *G01N 27/62* | (2021.01) |
| *G01N 30/86* | (2006.01) |
| *G01N 30/74* | (2006.01) |
| *G01N 30/78* | (2006.01) |
| *G06F 17/11* | (2006.01) |

(52) U.S. Cl.
CPC ............ *G01N 27/64* (2013.01); *G01N 30/74* (2013.01); *G01N 30/78* (2013.01); *G01N 30/86* (2013.01); *G01N 30/72* (2013.01); *G06F 17/11* (2013.01)

(58) Field of Classification Search
CPC .. G01N 30/8675; G01N 27/62; G01N 27/622; G01N 27/64; G06F 17/11; H01J 49/00; H01J 49/0009; H01J 49/0027; H01J 49/004; H01J 49/02; H01J 49/0404

USPC .......................... 250/281, 282, 288; 73/23.37
See application file for complete search history.

(56) References Cited

U.S. PATENT DOCUMENTS

| | | | |
|---|---|---|---|
| 2015/0198569 A1 | 7/2015 | Baba et al. | |
| 2016/0025691 A1* | 1/2016 | Eda .................... | H01J 49/0036 702/23 |

FOREIGN PATENT DOCUMENTS

| | | |
|---|---|---|
| EP | 1582868 A1 | 10/2005 |
| JP | 2002-181784 A | 6/2002 |
| JP | 2014-219317 A | 11/2014 |

OTHER PUBLICATIONS

Notice of First Examination Opinion dated Feb. 1, 2021 from the China National Intellectual Property Administration in CN Application No. 201680090726.6.
International Search Report for PCT/JP2016/083173 dated Jan. 24, 2017 [PCT/ISA/210].
Written Opinion for PCT/JP2016/083173 dated Jan. 24, 2017 [PCT/ISA/237].

* cited by examiner

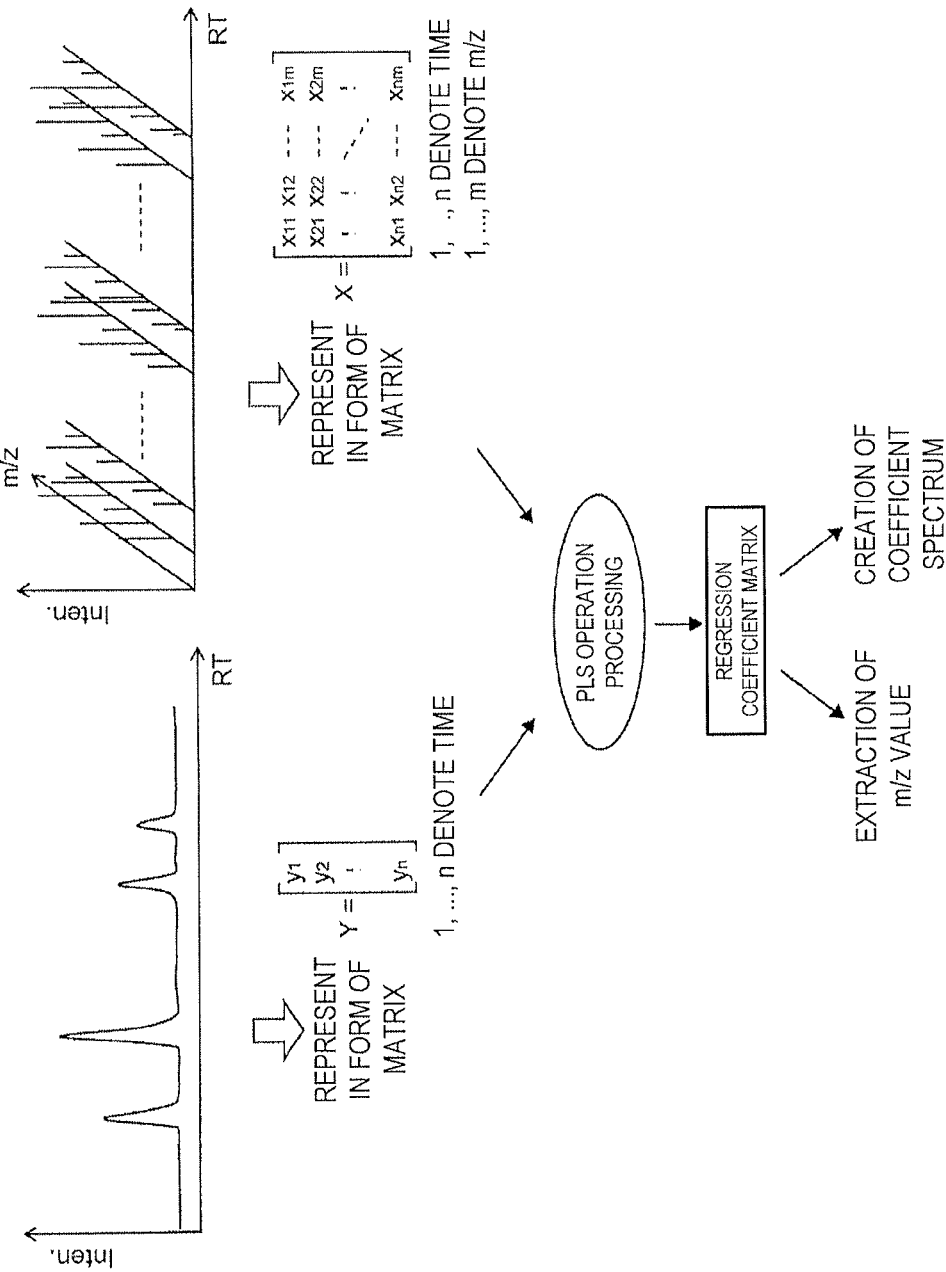

DATA ANALYZER FOR CHROMATOGRAPH MASS SPECTROMETRY

This application is a National Stage of International Application No. PCT/JP2016/083173, filed Nov. 9, 2016.

The present invention relates to a data analyzer that analyzes data obtained by a chromatograph mass spectrometer which is a combination of a chromatograph, such as a liquid chromatograph (LC) or a gas chromatograph (GC), and a mass spectrometer, and more particularly to a data analyzer for a chromatograph mass spectrometer with a detector that is provided separately from a mass spectrometer to detect components in a sample from a chromatograph.

BACKGROUND ART

A liquid chromatograph mass spectrometer (LC-MS) uses a mass spectrometer as a detector of a liquid chromatograph; some of LC-MSs further use another detector, such as an ultraviolet-visible spectroscopy detector (a UV detector) or a photodiode array detector (a PDA detector) (see Patent Literatures 1 and 2, and the like). Also as for a gas chromatograph mass spectrometer (GC-MS) using a mass spectrometer as a detector of a gas chromatograph, some of GC-MSs use another detector, such as a photoionization detector (PID) or a flame ionization detector (FID), in combination with the mass spectrometer. Hereinafter, in this specification, a detector used in combination with a mass spectrometer that is a main detector in an LC-MS or a GC-MS may be referred to as a sub-detector, irrespective of the system. Furthermore, in the following description, an LC-MS or a GC-MS that is provided with a sub-detector will be simply referred to as an LC-MS or a GC-MS.

A UV detector or a PDA detector, for example, can measure temporal changes in absorbance of a component in a sample with respect to each wavelength. A specific chemical structure in molecules may specifically absorb a certain wavelength. In such a case, if temporal changes in absorbance at a specific wavelength are measured by a UV detector or a PDA detector, and a chromatogram showing the temporal changes is created, a peak derived from a molecular species having the specific chemical structure appears on the chromatogram. Accordingly, analysis using the above-described LC-MS has been conventionally performed to extract mass information pertaining to a target molecular species, such as the one having a specific chemical structure, from a mass spectrum with a peak appearing on such a chromatogram as a clue.

In general, when such analysis is performed, first, a peak is detected on a chromatogram created on the basis of signals detected by a sub-detector, such as a UV detector. Then, a cumulative mass spectrum is obtained by accumulating or averaging, in a time direction among collected mass spectrum data, mass spectrum data included in a time range corresponding to the detected peak. A characteristic mass-to-charge ratio is retrieved from the cumulative mass spectrum obtained in this way, and a molecular species having a specific chemical structure contained in a sample is identified by reference to a retention time and information of the mass-to-charge ratio.

CITATION LIST

Patent Literature

Patent Literature 1: JP 2002-181784 A
Patent Literature 2: JP 2014-219317 A

SUMMARY OF INVENTION

Technical Problem

There are various algorithms for detecting a peak on a chromatogram as described above; however, various parameters are required for the peak detection and basically they need to be manually set by an operator (a user). It takes time to determine a parameter for appropriately detecting a peak, and requires operator's skill and experience. Thus, in recent data analysis work, it is strongly required to automatically perform an appropriate analysis even by an operator having no knowledge or experience of such work.

The present invention has been made in view of such problems, and an object of the invention is to provide a data analyzer for chromatograph mass spectrometry capable of assuredly and efficiently extracting mass information pertaining to a characteristic molecular species, such as the one having a specific chemical structure, by using information obtained by a sub-detector.

Solution to Problem

The present invention made to solve the above-described problems is a data analyzer for chromatograph mass spectrometry that analyzes data collected by a chromatograph mass spectrometer provided with a chromatograph that temporally separates components in a sample, a main detector that is a mass spectrometer configured to detect the components separated by the chromatograph, and a sub-detector that is provided separately from the mass spectrometer to detect the components separated by the chromatograph, and includes:

a) an operation processing unit that performs an operation on mass spectrum data repeatedly obtained by the main detector and chromatogram data obtained by the sub-detector to examine a correlation between temporal changes in a signal intensity value in the chromatogram data and temporal changes in a signal intensity value of each mass-to-charge ratio in the mass spectrum data; and b) a mass-to-charge ratio value extracting unit that extracts a mass-to-charge ratio value having a relatively high correlation on the basis of an index value associated with the correlation obtained with respect to each mass-to-charge ratio value through the operation performed by the operation processing unit.

In the data analyzer for chromatograph mass spectrometry according to the present invention, the chromatograph is typically a liquid chromatograph or a gas chromatograph. In a case where the chromatograph is a liquid chromatograph, the sub-detector is typically a detector, such as a photodiode array detector or an ultraviolet-visible spectroscopy detector, that sequentially detects components contained in an eluate from a column of the liquid chromatograph, i.e., measures temporal changes in a signal depending on a property or characteristic of the components contained in the eluate; however, the sub-detector may be a detector that detects components after nebulizing or vaporizing a liquid sample, as with the mass spectrometer.

Furthermore, in a case where the chromatograph is a gas chromatograph, a photoionization detector, a flame ionization detector, a dielectric barrier discharge ionization detector, or the like may be used as the sub-detector.

In the data analyzer for chromatograph mass spectrometry according to the present invention, the operation processing unit performs a predetermined statistical analysis process on the mass spectrum data having three dimensions that are the mass-to-charge ratio, the time, and the signal intensity repeatedly obtained by the mass spectrometer that is the main detector and the chromatogram data having two dimensions that are the time and the signal intensity obtained by the sub-detector. More specifically, an index value indicating a similarity or difference in temporal changes in the signal intensity value is calculated by performing the statistical analysis process on respective data obtained at the same measurement time between the mass spectrum data and the chromatogram data. The simplest statistical analysis process that can be used for such a purpose is a correlation analysis technique to calculate a coefficient of correlation between temporal changes in the signal intensity value in the chromatogram data and temporal changes in the signal intensity value of each mass-to-charge ratio in the mass spectrum data.

Furthermore, a multivariate analysis technique that is a technique to find a correlation virtually, for example, partial least squares (PLS), discriminant analysis, etc. may be used. That is, as an embodiment of the data analyzer for chromatograph mass spectrometry according to the present invention, the operation processing unit can be configured to perform an operation using partial least squares to find a regression coefficient as the index value.

Through the statistical analysis process performed by the operation processing unit, an index value associated with the correlation is obtained with respect to each mass-to-charge ratio value. Accordingly, for example, the mass-to-charge ratio value extracting unit extracts a mass-to-charge ratio value having a relatively high correlation by comparing the index value with a preset threshold. For example, in a case where the sub-detector specifically detects a specific chemical structure, if a chromatogram is created on the basis of chromatogram data obtained from the sub-detector, its waveform has a peak around the time at which components (molecules) having the chemical structure reach the sub-detector. Therefore, a mass-to-charge ratio that allows a waveform highly correlated with this chromatogram to be obtained is likely to be components having the chemical structure. Accordingly, an operator can efficiently make identification etc. of the components having the chemical structure by checking the waveform of an extracted ion chromatogram with a focus on the mass-to-charge ratio extracted by the mass-to-charge ratio value extracting unit or collecting several pieces of mass-to-charge ratio information detected in the same retention time.

The data analyzer for chromatograph mass spectrometry according to the present invention can also be configured to further include:

an extracted ion chromatogram creating unit that creates an extracted ion chromatogram of the mass-to-charge ratio extracted by the mass-to-charge ratio value extracting unit on the basis of the mass spectrum data; and a display processing unit that displays the extracted ion chromatogram and a chromatogram based on the chromatogram data on a screen of a display unit.

According to this configuration, the extracted ion chromatogram that the operator targets or should check is automatically created, and is displayed together with the chromatogram based on a signal detected by the sub-detector; therefore, burden on the operator in analysis of a specific component as described above is further reduced.

The data analyzer for chromatograph mass spectrometry according to the present invention can also be configured to further include:

an index value spectrum creating unit that creates an index value spectrum showing a relationship between the index value obtained with respect to each mass-to-charge ratio value and the mass-to-charge ratio; and a display processing unit that displays the index value spectrum on the screen of the display unit.

According to this configuration, the operator can immediately recognize respective index values corresponding to the all mass-to-charge ratios from the displayed index value spectrum. Thus, the operator can determine and extract a mass-to-charge ratio value having a relatively high correlation by him/herself. Furthermore, in a case where the mass-to-charge ratio value extracting unit automatically extracts a mass-to-charge ratio value having a relatively high correlation as described above, the operator can find a mass-to-charge ratio value that has not been automatically extracted because its index value does not reach the threshold yet is close to the threshold.

Advantageous Effects of Invention

The data analyzer for chromatograph mass spectrometry according to the present invention can accurately extract mass information pertaining to a characteristic molecular species, such as the one having a specific chemical structure, by using information obtained by the sub-detector that adopts a different method from the mass spectrometer, such as an ultraviolet-visible spectroscopy detector or a photodiode array detector. Furthermore, the operator's complicated and time-consuming work in such analysis is reduced, thus it is possible to efficiently proceed with the analysis, and also possible to achieve reliable and highly-reproducible analysis without dependence on the operator's skill and experience.

BRIEF DESCRIPTION OF DRAWINGS

FIG. 3 is an explanatory diagram of the data analysis process in the LC-MS system according to the embodiment.

DESCRIPTION OF EMBODIMENTS

An embodiment of an LC-MS system using a data analyzer according to the present invention is described below with reference to the accompanying drawings.

Figure 1:
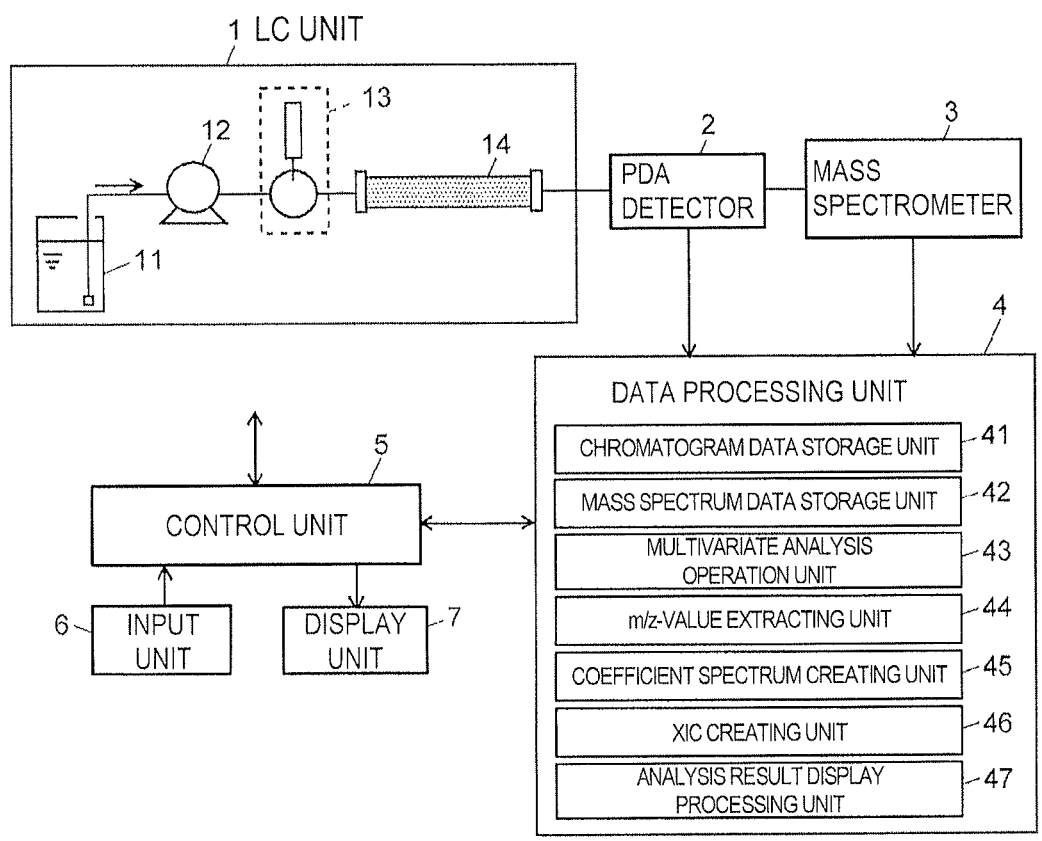
FIG. 1 is a schematic configuration diagram of an embodiment of an LC-MS system using a data analyzer according to the present embodiment.

FIG. 1 is a schematic configuration diagram of the LC-MS system according to the present embodiment.

The LC-MS system according to the present embodiment includes a liquid chromatograph (LC) unit 1, a PDA detector 2, a mass spectrometer 3, a data processing unit 4, a control unit 5, an input unit 6, and a display unit 7.

The LC unit 1 includes a mobile phase container 11 in which a mobile phase is retained, a liquid feeding pump 12 that sucks the mobile phase from the mobile phase container 11 and feeds the mobile phase at an approximately constant flow velocity, an injector 13 that injects a predetermined amount of sample into the mobile phase, and a column 14 in which components in the sample are separated temporally. An eluate from an exit of the column 14 is introduced into the mass spectrometer 3 through a sample cell (not shown) of the PDA detector 2. A detection signal obtained by the PDA detector 2 and a detection signal obtained by the mass spectrometer 3 are each converted into digital data by an analog-to-digital converter (ADC) that is not shown, and are each input to the data processing unit 4. Incidentally, in general, it is difficult for the mass spectrometer 3 to measure the entire quantity of eluate that has passed through the sample cell of the PDA detector 2; therefore, there is adopted a configuration in which a portion of the eluate that has passed through the sample cell is separated by a splitter or the like and introduced into the mass spectrometer 3.

To conduct a characteristic process to be described later, the data processing unit 4 includes functional blocks, such as a chromatogram data storage unit 41, a mass spectrum data storage unit 42, a multivariate analysis operation unit 43, an m/z-value extracting unit 44, a coefficient spectrum creating unit 45, an XIC creating unit 46, and an analysis result display processing unit 47.

In general, entities of the data processing unit 4 and the control unit 5 are a personal computer. Then, respective functions of the above functional blocks can be realized by this computer executing dedicated control and processing software installed on the computer.

In the LC-MS system according to the present embodiment, data is collected through a measurement made as follows.

Under control of the control unit 5, the liquid feeding pump 12 feeds a mobile phase into the column 14 at a constant flow velocity. When a sample containing many components has been injected into the mobile phase from the injector 13 at predetermined timing, the sample is introduced into the column 14 along with the flow of the mobile phase, and the components in the sample are separated temporally while the sample is passing through the column 14. An eluate eluted from the exit of the column 14 contains the components separated in the column 14. Although not illustrated, the PDA detector 2 includes a light source, a spectrometer, PDA detection elements, etc., besides the sample cell. The eluate passing through the sample cell is irradiated with light emitted from the light source, and transmitted light that has been transmitted through the eluate is subjected to wavelength dispersion by the spectrometer, and the PDA detection elements detect the intensity of light of each wavelength almost simultaneously. Thus, detection signals reflecting light absorption characteristics over a predetermined range of wavelengths are obtained at a time. These detection signals are sampled and digitalized at predetermined time intervals, and the digitalized signals are sent to the data processing unit 4 and stored in the chromatogram data storage unit 41.

The eluate that has passed through the sample cell of the PDA detector 2 is introduced into the mass spectrometer 3. In the mass spectrometer 3, a scanning measurement over a predetermined mass-to-charge ratio range is repeatedly performed on the eluate, and mass spectrum data over the mass-to-charge ratio range is obtained in each scanning measurement. This mass spectrum data is sent to the data processing unit 4 and stored in the mass spectrum data storage unit 42.

Figure 2:
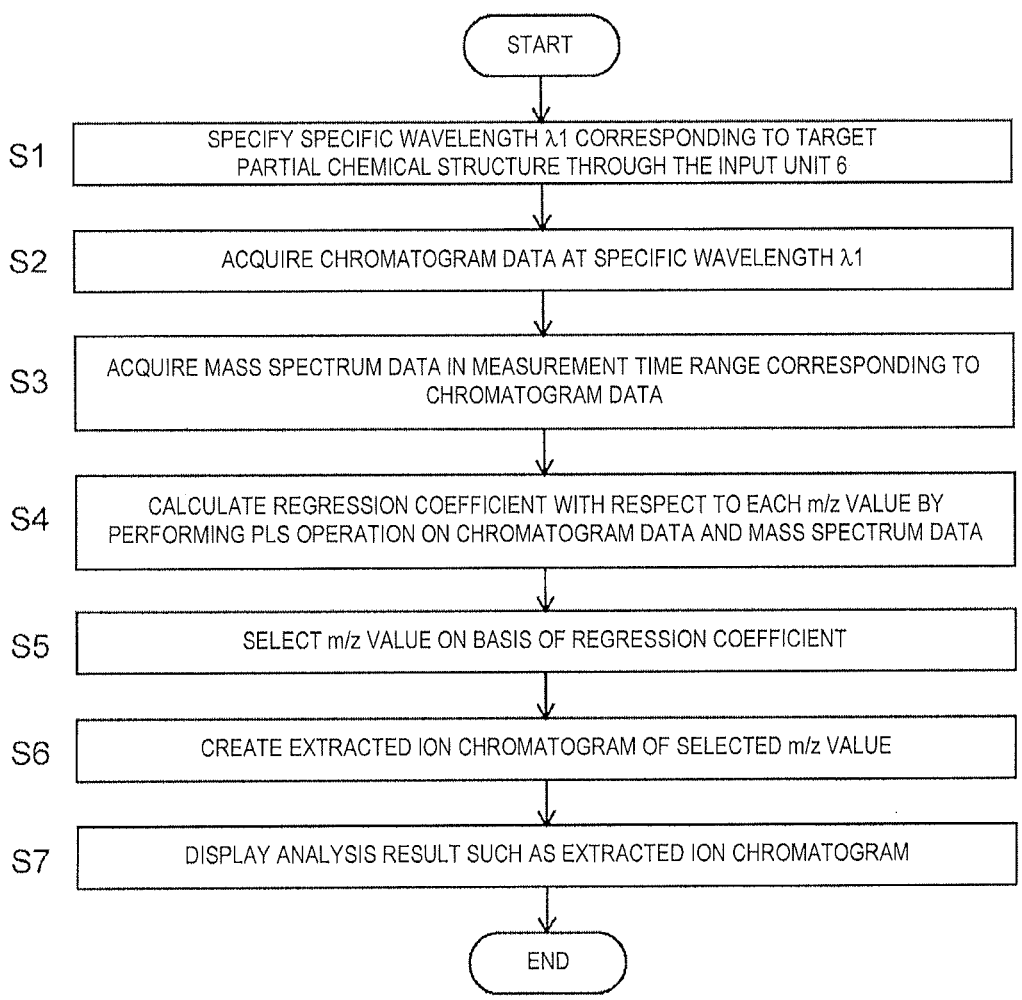
FIG. 2 is a flowchart showing the procedure of a data analysis process in the LC-MS system according to the embodiment.

A characteristic data analysis process in a case where a compound having a specific chemical structure is analyzed exhaustively in the LC-MS system according to the present embodiment is described with reference to FIGS. 2 and 3. FIG. 2 is a flowchart showing the procedure of this data analysis process, and FIG. 3 is a schematic explanatory diagram of the data analysis process.

As described above, a compound having a specific partial chemical structure may show a high absorbance at a specific wavelength $\lambda 1$ that is specific to the partial chemical structure. Accordingly, an operator specifies information of the specific wavelength $\lambda 1$ corresponding to the compound having the target partial chemical structure through the input unit 6 (Step S1). Alternatively, when the operator has selected an appropriate one from a list of partial chemical structures prepared in advance, instead of inputting a value of the wavelength $\lambda 1$, the corresponding wavelength $\lambda 1$ may be automatically set.

The multivariate analysis operation unit 43 selectively reads out chromatogram data showing temporal changes in signal intensity at the wavelength $\lambda 1$ specified or automatically set at Step S1, from the chromatogram data storage unit 41 (Step S2). Instead of reading out chromatogram data in the entire measurement time range from the start of a measurement to the end of the measurement, the multivariate analysis operation unit 43 may read out chromatogram data only in a measurement time range specified by the operator in advance (for example, at the same time as Step S1). In the following description, the chromatogram data read here is referred to as reference chromatogram data, and a chromatogram created or formed on the basis of this data is referred to as a reference chromatogram.

The multivariate analysis operation unit 43 also reads out mass spectrum data in a measurement time range corresponding to the chromatogram data read out at Step S2, from the mass spectrum data storage unit 42 (Step S3). Normally, there is a time delay td from a time when an eluate containing a certain component passes through a sample cell in the PDA detector 2, i.e., a time when the eluate is detected by the PDA detector 2 until the eluate is introduced into and detected by the mass spectrometer 3. Accordingly, the time delay td is desirably corrected so that a comparison of a retention time between both data can be made.

The time delay td depends on parameters of the volume of an eluate flow path as well as the flow velocity of a mobile phase, etc. These parameters have been set when a measurement is performed; therefore, the time delay td can be calculated on the basis of these parameters. Accordingly, after the time delay td is calculated in this way, the time axis of the reference chromatogram data is totally set back by the time delay td, or the time axis of repeatedly obtained mass spectrum data is adjusted so as to be totally put forward, thus the time axes of both the data can be adjusted so that the time delay td becomes zero.

Instead of correcting the time delay td when data processing is performed, the time delay td may be corrected at a step of acquiring data, i.e., at a step of storing respective data in the data storage units 41 and 42. In a case where such a correction is made, there is no need for the above-described correction of the time delay td when data is read out.

Then, using PLS that is a technique for multivariate analysis, the multivariate analysis operation unit 43 finds out a correlation between temporal changes in the signal intensity value of the reference chromatogram data and temporal changes in the signal intensity value of each mass-to-charge ratio in the repeatedly obtained mass spectrum data. i.e., temporal changes in the signal intensity value of an extracted ion chromatogram.

Specifically, the multivariate analysis operation unit 43 first represents each of data of the signal intensity value at each measurement time in the reference chromatogram data and data of the signal intensity value at each mass-to-charge ratio in the mass spectrum data in the form of a matrix. As shown in FIG. 3, the signal intensity value in the reference chromatogram data can be represented by a one-dimensional matrix Y in which respective signal intensity values $y_1$, $y_2, \ldots, y_n$ at measurement times are arrayed, and the signal intensity value in the mass spectrum data can be represented by a two-dimensional matrix X in which respective signal intensity values $x_{11}$, $x_{12}$, ..., $x_{1m}$, $x_{21}$, $x_{22}$, ..., $x_{2m}$, ..., $x_{n1}$, $x_{n2}$, ..., $x_{nm}$ at measurement times and mass-to-charge ratios are arrayed in two dimensions.

The multivariate analysis operation unit 43 then calculates a regression coefficient matrix by performing a well-known PLS operation with the two-dimensional matrix X of the signal intensity value in the mass spectrum data as an explanatory variable (an input variable) and the one-dimensional matrix Y of the signal intensity value in the reference chromatogram data as an explained variable (an output variable) (Step S4). This regression coefficient matrix includes m elements, and is a matrix in which regression coefficients of the mass-to-charge ratios are arrayed. These regression coefficients show the strength of a correlation at each mass-to-charge ratio between the reference chromatogram data and the mass spectrum data, where the signal intensity value data based on the reference chromatogram data is used as training data. Therefore, a mass-to-charge ratio having a high regression coefficient is a mass-to-charge ratio of which the temporal changes in signal intensity on a mass spectrum are close to the temporal changes in signal intensity based on the reference chromatogram data.

In addition to PLS, multivariate analyses such as ordinary least squares regression (OLS), principal component analysis (PCA), and principal component regression (PCR) may be used as long as they are a multivariate analysis to calculate an index value indicating a correlation. Furthermore, a correlation coefficient may be found by using a simpler correlation analysis technique.

The m/z-value extracting unit 44 compares the found regression coefficient of each mass-to-charge ratio with a predetermined threshold, and extracts a mass-to-charge ratio of which the regression coefficient is equal to or more than the threshold (Step S5). The threshold that is a criterion at this time may be a default value set in the system; however, it is preferable that the threshold can be optionally set by the operator. Furthermore, the coefficient spectrum creating unit 45 creates a coefficient spectrum, where the horizontal axis indicates the mass-to-charge ratio, and the vertical axis indicates the regression coefficient value, on the basis of the regression coefficient matrix. Alternatively, the m/z-value extracting unit 44 may extract a mass-to-charge ratio of which the regression coefficient is equal to or more than the threshold on the coefficient spectrum created by the coefficient spectrum creating unit 45.

The XIC creating unit 46 creates an extracted ion chromatogram (XIC) at the mass-to-charge ratio extracted at Step S5 (Step S6). Then, the analysis result display processing unit 47 displays, as an analysis result, both a reference chromatogram created on the basis of the reference chromatogram data acquired at Step S2 and the extracted ion chromatogram created at Step S6, on a screen of the display unit 7 (Step S7). At this time, the chromatograms is desirably displayed, for example, in different display colors to be superimposed on top of the other by aligning respective time axes with each other. Furthermore, a regression coefficient spectrum is also desirably displayed on the screen of the display unit 7.

On the reference chromatogram created on the basis of the reference chromatogram data acquired at Step S2, a peak corresponding to the compound having the partial chemical structure the operator targets should appear. Therefore, also on the extracted ion chromatogram created at Step S6, a peak corresponding to a compound having the same partial chemical structure is likely to appear. As described above, by displaying the extracted ion chromatogram and the reference chromatogram, for example, in different display colors to be superimposed on top of the other, the operator can easily find respective peaks appearing in the same retention time on both the chromatograms, and can perform analysis work, such as identifying a compound, on the basis of the retention time of the peaks etc.

In the above-described embodiment, a regression coefficient is calculated without specifying the retention time (a measurement time range) or a mass-to-charge ratio, however, in that case, there are many rows and columns in the matrices X and Y shown in FIG. 3, and the calculation amount of a PLS operation becomes huge. As a result, it may take time to obtain a result of the calculation, or it may require a high-performance computer. Accordingly, before the execution of Step S4, a user may specify a retention time range and a value or range of a mass-to-charge ratio of an object of regression coefficient calculation, and the multivariate analysis operation unit 43 may calculate a regression coefficient by performing a PLS operation on only data included in the specified retention time range and/or the specified value or range of the mass-to-charge ratio. This enables a reduction in calculation amount of a PLS operation or the like. Furthermore, only a result of a retention time or a mass-to-charge ratio that the user is interested in can be obtained, thus there is no need to check a result of no interest, and the efficiency of analysis can be improved.

Moreover, instead of performing a PLS operation on the entire retention time range or the entire mass-to-charge ratio range at one time, the retention time range or the mass-to-charge ratio range may be divided into a plurality of subranges, and a regression coefficient may be found by performing a PLS operation on each of the subranges of the retention time range and/or the mass-to-charge ratio range. In this case, if a result is displayed each time a regression coefficient of a subrange is found, once the user has confirmed a result of interest, subsequent processing of the operation can be terminated in mid-course. The subrange (a duration of the retention time or the like) by which the retention time range or the mass-to-charge ratio range is divided may be specified by the user, or may be automatically determined.

In the LC-MS system according to the above-described embodiment, a PDA detector is used as the sub-detector; alternatively, a UV detector may be used. However, in general, in a case of a UV detector, a spectrometer performs mechanical wavelength scanning, unlike a PDA detector; therefore, it takes time to measure an absorbance spectrum over a certain wavelength range. Accordingly, it may be configured that before the measurement, i.e., before data acquisition, the operator inputs one or more target wavelengths, and data showing an absorbance only at the input one or more wavelengths is acquired, in other words, an absorbance only at a specific wavelength is desirably measured instead of measuring an absorbance spectrum in the entire predetermined wavelength range. Furthermore, detectors other than a PDA detector and a UV detector, for example, a fluorescent detector etc. may be used as the sub-detector, and further, a nuclear magnetic resonator (NMR) may be used as the sub-detector.

Furthermore, the data analyzer according to the present invention can be applied to a GC-MS system as well. In that case, as the sub-detector, a detector capable of detecting a compound having a characteristic chemical structure or substance, such as a photoionization detector, a flame ionization detector, or a dielectric barrier discharge ionization detector, is desirably used.

Moreover, a reference chromatogram used for analysis by the data analyzer according to the present invention may be acquired by not a general GC or LC, but a comprehensive two-dimensional chromatograph, such as GC×GC (a comprehensive two-dimensional GC) or LC×LC (a comprehensive two-dimensional LC), or a supercritical fluid chromatograph, etc.

Furthermore, a mass spectrum obtained by the mass spectrometer 3 is not limited to a general mass spectrum (an $MS^1$ spectrum), and may be an $MS^n$ spectrum (or an MS/MS spectrum), an In source decay (ISD) spectrum like the one obtained by a mass spectrometer with an ion source according to an electronic ionization (EI) method, or an $MS^E$ spectrum available from Waters Corporation, U.S.

It should be noted that the embodiment described thus far is merely an example of the present invention, and it is evident that any modification, adjustment, or addition made within the spirit of the present invention is also included in the scope of the claims of the present application.

REFERENCE SIGNS LIST

1 . . . Liquid Chromatograph (LC) Unit
11 . . . Mobile Phase Container
12 . . . Liquid Feeding Pump
13 . . . Injector
14 . . . Column
2 . . . PDA Detector
3 . . . Mass Spectrometer
4 . . . Data Processing Unit
41 . . . Chromatogram Data Storage Unit
42 . . . Mass Spectrum Data Storage Unit
43 . . . Multivariate Analysis Operation Unit
44 . . . m/z-value Extracting Unit
45 . . . Coefficient Spectrum Creating Unit
46 . . . XIC Creating Unit
47 . . . Analysis Result Display Processing Unit
5 . . . Control Unit
6 . . . Input Unit
7 . . . Display Unit

The invention claimed is:

1. A data analyzer for chromatograph mass spectrometry that analyzes data collected by a chromatograph mass spectrometer provided with a chromatograph that temporally separates components in a sample, a main detector that is a mass spectrometer configured to detect components in the sample containing the component separated by the chromatograph, and a sub-detector that is provided separately from the mass spectrometer to detect components in the sample containing the components separated by the chromatograph, the data analyzer for chromatograph mass spectrometry comprising:
   a) an operation processing unit that performs an operation on mass spectrum data repeatedly obtained by the main detector and chromatogram data obtained by the sub-detector to examine a correlation between temporal changes in a signal intensity value in the chromatogram data and temporal changes in a signal intensity value of each mass-to-charge ratio in the mass spectrum data; and
   b) a mass-to-charge ratio value extracting unit that extracts a mass-to-charge ratio value having a relatively high correlation on a basis of an index value associated with the correlation obtained with respect to each mass-to-charge ratio value through the operation performed by the operation processing unit.

2. The data analyzer for chromatograph mass spectrometry according to claim 1, wherein the operation processing unit performs an operation using partial least squares to find a regression coefficient as the index value.

3. The data analyzer for chromatograph mass spectrometry according to claim 1, wherein the chromatograph is a liquid chromatograph, and the sub-detector is a photodiode array detector or an ultraviolet-visible spectroscopy detector.

4. The data analyzer for chromatograph mass spectrometry according to claim 1, further comprising:
   an extracted ion chromatogram creating unit that creates an extracted ion chromatogram of the mass-to-charge ratio extracted by the mass-to-charge ratio value extracting unit on a basis of the mass spectrum data; and
   a display processing unit that displays the extracted ion chromatogram and a chromatogram based on the chromatogram data on a screen of a display unit.

5. The data analyzer for chromatograph mass spectrometry according to claim 1, further comprising:
   an index value spectrum creating unit that creates an index value spectrum showing a relationship between the index value obtained with respect to each mass-to-charge ratio value and the mass-to-charge ratio; and
   a display processing unit that displays the index value spectrum on a screen of a display unit.

* * * * *